United States Patent

Vossenkemper

[11] Patent Number: 4,513,800
[45] Date of Patent: Apr. 30, 1985

[54] TIRE CHAIN MOUNTING DEVICE

[76] Inventor: Earl H. Vossenkemper, 10646 Arboretum Pl., San Diego, Calif. 92131

[21] Appl. No.: 429,976

[22] Filed: Sep. 30, 1982

[51] Int. Cl.³ .............................................. B60C 27/06
[52] U.S. Cl. .................... 152/213 A; 29/428; 81/15.8; 152/242
[58] Field of Search .............. 152/213 R, 213 A, 216, 152/217, 218, 219, 220, 231, 239, 240, 241, 242; 81/15.8; 59/85, 86, 93; 269/47; 24/68 A, 69 TT, 230.5 AD, 241 S, 68 TT, 121, 68 CT, 230.5 W; 29/428

[56] References Cited

U.S. PATENT DOCUMENTS

| | | | |
|---|---|---|---|
| 2,316,718 | 4/1943 | Royer | 152/213 A |
| 2,478,335 | 8/1949 | Stark | 152/213 R X |
| 2,484,714 | 10/1949 | Kapp | 152/213 R |
| 2,731,059 | 1/1956 | Ford | 152/213 R |
| 3,870,093 | 3/1975 | Driggers | 152/213 R |
| 3,937,263 | 2/1976 | Hill et al. | 152/213 R |
| 4,031,939 | 6/1977 | Martini | 152/213 R |
| 4,103,870 | 8/1978 | Murakami | 152/213 R |

Primary Examiner—William A. Powell
Assistant Examiner—Thomas Bokan
Attorney, Agent, or Firm—Thomas J. Tighe

[57] ABSTRACT

A spacer, such as a block, upon which a tire is driven and positioned upon. Engaged with the spacer is a bracket means for temporary holding an open link. The tire chain is draped over the tire and the end links of the innerside segment of the tire chain are joined by slipping them into the gap of the open link which is held in place by the bracket and clip means. The outerside segment end links are joined and tightened conventionally. The invention is then disengaged from the open link and the tire is driven off the spacer means.

12 Claims, 3 Drawing Figures

TIRE CHAIN MOUNTING DEVICE

BACKGROUND OF THE INVENTION

This invention relates to non-skid tire chain mounting devices and aids, most particularly to those devices and aids utilizing a means of spacing the tire above the surface upon which the tire had rested.

Tire chain installation heretofore has never been a pleasant task. Typically, tire chains are installed out-of-doors in cold weather and usually when the ground or roadway is covered with ice, snow and quite often slush. It is therefore highly desirable that the installer be able to mount the tire chains quickly. Furthermore, it is highly desirable that the installation require minimum contact between the installer and the ground or roadway.

Existing tire chains and mounting devices require that the installer use both hands simultaneously on the inner side of the tire, and use of both hands dictates that the installer lie upon the ground and reach behind the tire to join end links on the inner side of the tire. Lying on the ground usually results in soiled and sometimes wet clothing and hair. This invention greatly facilitates the task of mounting chains and eliminates the necessity of having the installer lie, or nearly lie, upon the ground during the installation.

U.S. Pat. Nos. 2,484,714 by Kapp, 2,731,059 by Ford, and 3,870,093 by Driggers present tire chain applying devices which appear to eliminate the aforementioned ground-lying, but they illustrate another problem with all such devices heretofore presented. In order to install the chains, the tire must be rolled either forward or backward a distance equivalent to the circumference of the tire. This can present difficulties when the vehicle to which the tire is attached is in a crowded parking lot with little room to operate, for example a parking lot of a busy ski lodge. In such a situation, the installer invariably interferes with the passage of other vehicles. This invention presents a device which has the further advantages of requiring that the vehicle be moved only a few inches and of not requiring the simultaneous use of both hands on the inner side of the tire.

U.S. Pat. Nos. 3,937,263 by Hill et al., 4,031,939 by Martini, and 4,103,870 by Murakami present ramp devices which aid in the mounting of tire chains. These devices have the common drawback that the tire chain, in order to be properly installed, must be laid-out on the ground with the middle cross segments of the tire chain positioned in grooves associated with each ramp before the tire can be driven onto the ramp. In other words, the tire must be driven over half of the chain before it is positioned on the ramp. Thus, although the operating distance for these devices is less than that required by the devices discussed in the preceding paragraph, it is still equal to at least one-half the circumference of the tire. As mentioned before, the operating distance required by this invention is only a few inches, approximately six (6) inches. These require use of both hands behind the tire also.

A further drawback of the devices discussed in the preceding paragraph is the fact that the tire chains must be upwardly folded about the tire in order to join the end links. Thus, the installer is opposing gravity when trying to join the end links. This can be quite a problem for individuals who find tire chains heavy and unwieldy. This invention has the further advantage that the tire chains are folded downward around the tire and, thus, gravity aids in the installation of the chains.

Other attributes and advantages of this invention will be readily apparent upon a reading of the text hereinafter.

SUMMARY

This invention presents a spacer means, such as a rectangular block, for spacing the tire a suitable distance above the surface upon which the tire had rested. The suitable distance is determined by the size of the links of the cross segments of the tire chain because at least two (2) of the cross segments must be positioned between the tire and the surface during the mounting of the chain. After the tire is positioned upon the spacer means, the tire chain is draped over the tire and an open link means is used to join end links of the inner side segment of the tire chain. The joining of the end links by the open link means is facilitated by an open link temporary holding means, preferably a bracket, which is engaged with the spacer means. The open link means is held in a position suitable for joining the end links of the inner side segment of the tire chain by the holding means.

An object of this invention is to present a tire chain mounting device which eliminates the necessity of having the installer lie, or nearly lie, upon the ground in order to join the end links of the inner side segment of the tire chain.

It is a further object of this invention to present a device which requires less than a foot of operating range in order to fully mount a tire chain.

It is a further object of this invention to present a device which utilizes gravity to facilitate the installation of the tire chain.

A further object of this invention is to present a tire chain mounting device which does not require the simultaneous use of both hands in linking the inner side segment of the chain.

Other objects of this invention will be apparent upon a reading of the text hereinafter.

DESCRIPTION OF THE PREFERRED EMBODIMENT

Figure 1:
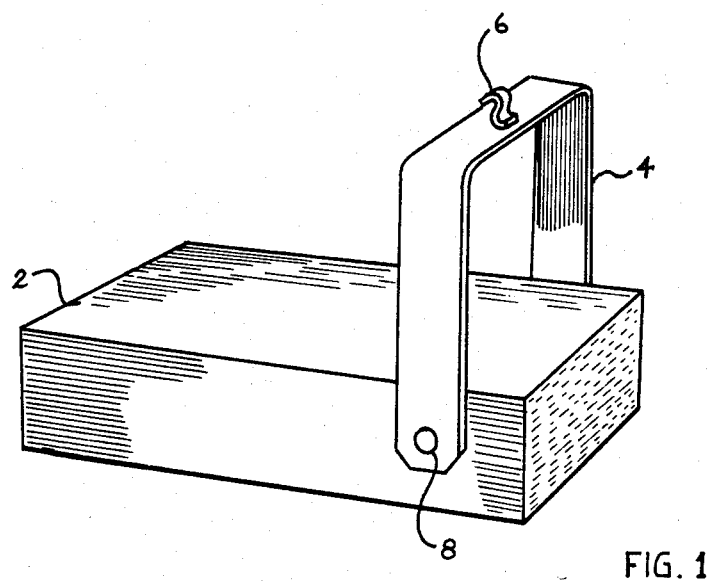
FIG. 1 is a pictorial view of the invention.
Figure 2:
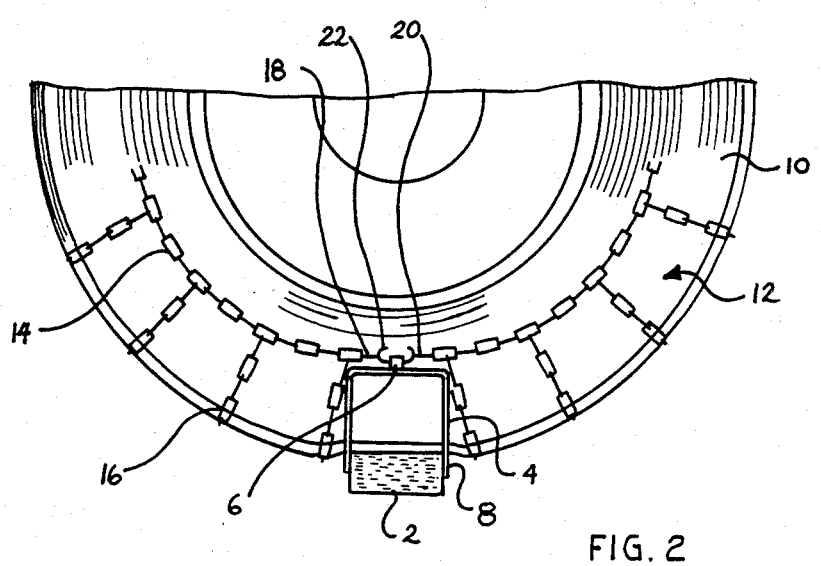
FIG. 2 is a side view of the inner side of a tire disposed upon the invention with a tire chain being installed.
Figure 3:
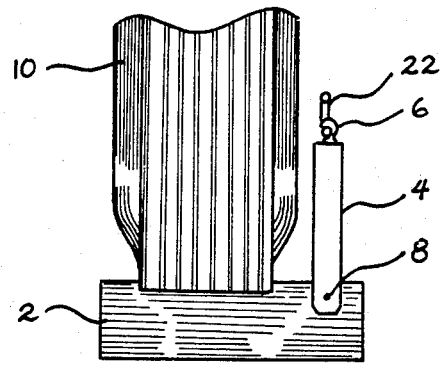
FIG. 3 is an end view of a tire disposed upon the invention.

Referring to FIGS. 1, 2 and 3, a spacer means 2 is shown as a rectangular block. Although the spacer means can be of a ramp design or other suitable design, it is preferable that it be a rectangular block with a cross section equal to that of a standard 2×4 board. In other words, the thickness is preferably one and one-half (1½) inches plus or minus a half inch, and the width is preferably three and one-half (3½), plus or minus a half inch. The length of the spacer means varies with the width of the tire which is to receive the tire chain. Engaged with the spacer means 2 it is an open link temporary holding means comprised of a bracket means 4 and a clip means 6. Preferably the bracket means 4 is pivotally engaged with the spacer means at pivot points 8 which are proximate to one end of the spacer means.

Referring to FIGS. 2 and 3, a tire 10 is shown disposed upon the spacer means 2. The tire has wrapped about it a tire chain 12. The tire chain 12 is comprised of an outerside segment (not shown), an innerside segment 14 and a plurality of cross segments 16. As can be seen the end links 18 and 20 of the innerside segment 14 are joined together by an open link means 22. The end links of the outerside segment (not shown) are joined together and the entire chain is tightened by conventional linking and tightening means.

In operation, the installation of a tire chain using this device is started by placing the spacer means transverse to the tire such that as the tire is rolled a few inches in the direction of the spacer means, the tire rolls up onto and remains upon the spacer means. Prior to the foregoing operation, the open link means is placed in the clip means with the gap facing outward from clip and the open link temporary holding means is either disengaged from the spacer means or is rotated downward to a horizontal position to avoid damage in case the driver of the vehicle makes an error in judgment while driving the tire upon the spacer means. Once the tire is in position upon the spacer means, the open link temporary holding means is engaged or rotated upward to a vertical position. The open link is then facing generally upward. The tire chain is then longitudinally symmetrically draped over the tire such that the end links of both the side segments are proximate to the surface upon which the spacer means is resting. The chain is then adjusted so that the cross segments most near the end links of the side segments are positioned between the tire and the surface and near the spacer means. The installer then reaches around one side of the tire with one hand and joins an end link of the innerside segment to the open link. He or she then does the same to the other end link of the innerside segment. At this point the two (2) end links of the innerside segment are joined by the open link, and the end links of the outerside segment can be joined and tightened. After the tire chain is mounted, the open link temporary holding means is disengaged from the open link and the tire is driven off the spacer means in either direction.

It can easily be seen that the only operating distance that is required by this invention is the distance the tire must travel to be rolled upon the spacer means. With a spacer means of approximately 3½" in length, that distance would be approximately 6". A 6" operating distance is considerably less than half of the circumference of the tire.

The open link temporary holding means can be separate from the spacer means but it is preferably engaged with the spacer means in order to provide a means of securing the holding means in a vertical position during the installation of the tire chain. The height at which the open link is held by the holding means in relation to the rim of the tire varies with the size of the tire and the type of tire chain used. The holding means can be suitably adjusted to position the open link at the height most suitable for joining the end links of the innerside segment. Preferably, the open link temporary holding means is pivotally engaged with the spacer means and held in a vertical position frictionally. The open link clip is merely a resilient clip which frictionally holds the open link in place.

To facilitate the linking of the innerside segment of the chain, the entire chain, as it is draped over the tire, can be offset to the inner side of the tire so that the slack of the inner side segment is increased. With more slack, the end links can be hooked onto the open link by the use of one hand each, and simultaneous use of both hands is not required.

The foregoing description is given for illustration purposes only and no unnecessary limitations in the claims hereinafter should be construed.

I claim:

1. A tire chain mounting device comprising:
   (a) a spacer means adapted to space a tire a distance above a surface upon which the tire had been resting, the distance being suitable to permit disposition of portions of the chain beneath the tire, the spacer means being further adapted not to obstruct said disposition;
   (b) an open link means used to couple end links of a side segment of the tire chain; and
   (c) an open link temporary holding means adapted to hold the open link means at a position suitable for a coupling of said end links, the open link temporary holding means being engaged with and held in place by the spacer means.

2. The device of claim 1 wherein the spacer means is adapted to being disposed between the tire and the surface upon which the tire had been resting such that the tire rests upon the spacer means.

3. The device of claim 2 wherein the spacer means is adapted to having the tire rolled up onto it.

4. The device of claim 1, 2 or 3 wherein the spacer means is a block means.

5. The device of claims 1, 2 or 3 wherein the open link temporary holding means comprises a bracket means pivotally engaged with the spacer means.

6. The device of claim 5 wherein the open link temporary holding means comprises a generally C shaped bracket with an open link holding clip affixed thereto.

7. The device of claim 1 or 2 wherein a suitable position at which the open link means is held is at a lowest point that the end links of a side segment could meet after the chain has been symmetrically wrapped about the circumference of the tire.

8. The device of claim 1 or 2 wherein the engagement of the open link temporary holding means and the spacer means is adapted to permit the open link temporary holding means to be removed from a position of possible damage by the tire while the tire is being moved into its spaced position.

9. A tire chain mounting device comprising:
   (a) a spacer means for spacing a tire a suitable distance above a surface upon which the tire had been resting;
   (b) an open link means used to couple end links of a side segment of the tire chain; and
   (c) a bracket means adapted to hold the open link means at a position suitable for coupling of said end links, the bracket means being engaged with and held in place by the spacer means.

10. The device of claim 9 wherein the spacer means is adapted to being disposed between the tire and the surface upon which the tire had been resting, such that the tire rests upon the spacer means.

11. The device of claim 10 wherein the spacer means is adapted to having the tire rolled up onto it.

12. The device of claim 9 wherein the spacer means is a block means.

* * * * *